July 18, 1950   H. J. WEBB   2,515,480
CONTROL CIRCUIT
Filed Sept. 24, 1946
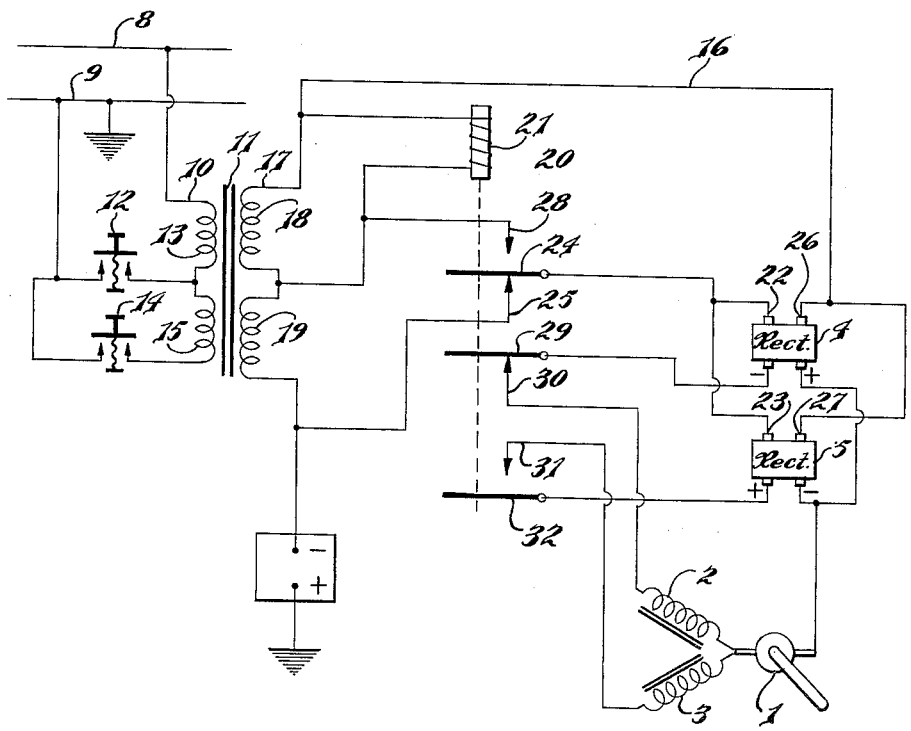
Inventor
Herbert J. Webb
By Robert A. Lavender
Attorney Patented July 18, 1950

2,515,480

UNITED STATES PATENT OFFICE 2,515,480

CONTROL CIRCUIT

Herbert J. Webb, Randolph, Mass., assignor, by mesne assignments, to the United States of America as represented by the United States Atomic Energy Commission Application September 24, 1946, Serial No. 698,977

6 Claims. (Cl. 171—97)

This invention relates to control systems and more particularly to electrical circuits permitting remotely controlled operation of electrical devices.

A particular object of the invention is to permit isolation of the controlled apparatus and circuit from the controlling portion physically as well as to direct electrical conductivity.

Another object of the invention is to perform electric control of the controlled apparatus from a single source of current with the minimum possible number of wires utilized between the control circuit and the controlled apparatus.

A particular feature of the invention is that electro-magnetic coupling means forms the sole inter-connection between the source of current and the controlled apparatus.

Another feature of the invention is that automatic means responsive to discrete voltage values provide selective actuation of the controlled apparatus in a desired manner from the point of control.

The invention contemplates an electrical control system in which the controlled apparatus has two alternate modes of operation and is either remotely located from the control point or is at a relatively high electrical potential with respect to control apparatus located at the control point. In order to reduce the number of conductors necessary to perform control of the apparatus, which may be an electric motor, the direction of which is to be changed at will, when the point of control is at a considerable distance; or to minimize insulation requirements when the apparatus is at a considerably higher electrical potential, a single electro-magnetic inter-coupling having a variable impedance ratio is provided between the control circuit and the operating circuit of the apparatus. Selecting one value of impedance ratio results in a voltage transfer adequate for energizing automatic voltage responsive means in the operating circuit to effect one mode of operation of the apparatus. Selecting another impedance ratio results in a voltage magnitude ineffective for the energizing of the above-mentioned means. This results automatically in the reverse operation. The circuit herein described compensates for the different voltage magnitudes produced solely for selective action and maintains the energizing voltage for actuating the apparatus substantially constant irrespective of the actual voltage transfer between the two circuits, namely the control circuit and the operating circuit.

Other objects and features will be apparent from the following description of the invention, pointed out in particularity in the appended claims, and taken in connection with the accompanying drawing in which the single figure illustrates a preferred form of the control circuit.

Referring to the drawing the controlled apparatus shown here by way of example is an electric motor 1 of the direct current type having field windings 2 and 3. When one is energized the motor will turn in one direction whereas when the other is energized it will turn in the reverse direction. The source for energizing the motor comprises rectifiers 4 and 5. It will be seen that the control system is equally effective to control the operation of alternating current type motors or any device which has two modes of operation such as an electro-magnetic switch or similar apparatus. The direct current device shown here in the form of the motor 1 and its associated rectifiers 4 and 5 is chosen particularly to illustrate the utility of the control system for controlling this type of equipment directly from an alternating current source.

The control portion of the circuit comprises the source of power shown here by the lines 8 and 9 and the primary winding 10 of the transformer 11. The winding 10 is divided and so connected that when the push button 12 is depressed only portion 13 of the winding 10 is energized from the supply line; whereas when the push button 14 is depressed both portions 15 and 13 of the winding 10 connected in series will be energized from the line. The control circuit may be operated from commercial power lines and the transformer 11 may be placed at a considerable distance from the push button switches 12 and 14 when remote actuation is desired. It is seen that only three wires are needed to connect the control circuit with the operating circuit of the motor.

The operating circuit connects to the secondary winding 17 of the transformer 11, and this winding is also divided, forming two portions 18 and 19, respectively. It should be noted here that the secondary winding 17 may be at a high direct current potential with respect to the supply source indicated by the lines 8 and 9. This is illustrated by the block diagram representing a D. C. supply of high voltage connected between ground and the secondary winding 17. In certain applications, for example in equipment utilized for mass spectrography and separation of isotopes, certain portions of the apparatus must be at a high direct current potential. Physical construction often requires that instrumentalities used for the control of valves or other mechanical elements be placed also at high potentials with respect to ground which is common with the circuit. In such cases insulation problems between the controlled apparatus and the control circuit at the power potential level offers a serious problem. The circuit herein provided permits effective isolation between in that only a single electro-magnetic coupling device, such as a transformer, is required for bi-directional actuation of electrical devices located far above ground potential.

Continuing with the description of the circuit, the portion 18 of the secondary winding 17 connects directly to the operating winding 21 of an electro-magnetic switch 20 having a plurality of contacts. The switch 20 in the de-energizing position as shown effects electrical inter-connection by means of conductor 24 and contact 25 between one terminal of the portion 19 of the winding 17 and one A. C. terminal 22 of rectifier 4 and one A. C. terminal 23 of rectifier 5. The other A. C. terminal 26 of rectifier 4 and terminal 27 of rectifier 5 connect directly to the portion 18 of the winding 17 through conductor 28. Observing this circuit it is seen that in this position of the electro-magnetic switch the two rectifiers 4 and 5 with respect to their A. C. input are in parallel and are connected across the entire secondary winding 17.

The direct current output of the rectifiers 4 and 5 is so arranged that the positive terminal of rectifier 4 connects to the negative terminal of rectifier 5 as well as to the common terminal of the motor 1. The field winding 2 of the latter connects to the negative terminal of the rectifier 4 by means of the contactor 29 and contact 30. Following this connection it is seen that rectifier 4, if energized, would supply current to the motor 1 through its number 2 field. The second field 3 of the motor 1 connects to the contact 31 which cooperates with the contactor 32 when the electro-magnetic switch 20 is energized.

Referring to the operation of the circuit it is to be noted that the actuating winding 21 of the electro-magnetic switch 20 is permanently connected in shunt with the portion 18 of the secondary winding 17 of the transformer 11. The turns ratio of the transformer is so calculated that one portion of the primary winding 10 must be energized from the supply source to obtain sufficient operating voltage across the portion 18 of the secondary 17. This is effected when the push button switch 12 is depressed and portion 13 of the primary winding 10 is energized. The voltage transfer due to a higher primary to secondary turns ratio in this instance will actuate the winding 21 of the switch 20. This results in the following circuit connections: the contactor 24 opens the circuit to contact 25 and closes it to contact 28. This connection places the A. C. terminals 22 and 23 of the rectifiers directly across the portion 18 of the secondary winding 17. Contactor 29 opens the circuit to contact 30 removing field 2 from the output of rectifier 4, whereas contactor 32 makes connection with connection 31 and connects field 3 to the positive terminal of rectifier 5. As long as the switch 12 is depressed, the motor 1 will be energized from the rectifier 5 through field 3 in one direction of operation. Let us assume that push button 12 is released and push button 14 is depressed, connecting the entire primary winding to the current source. The voltage transfer now is of a different ratio. For the purpose of simplifying the description, it may be assumed that the division between primary and secondary windings is equally in the mid-point. Therefore, when only one portion of the primary is energized, one-half of the secondary will have the same output voltage as both portions of the secondary when both portions 13 and 15 of the primary winding are energized. In other words, when one primary is energized the voltage across one secondary is the same as the voltage across both secondaries when both primaries are energized from the power line. The motor receives its operating potential from the transformer 11 through the rectifiers 4 and 5 and it requires the same voltage irrespective of the fields to be energized. The transfer switch 20 effects the compensation necessary in the output voltage of the transformer 11 by means of contactor 24 which places the rectifiers 4 or 5 either across the entire secondary winding 17 in the de-energized position of the switch 20 or across only one portion of the secondary 18 in the energized portion of the switch 20 previously described. In the light of this, it is clear that when push button 14 is depressed only one half of the voltage is available across the portion 18 of the secondary 17 and the transfer switch 20 remains in its normal position, the winding 21 not receiving sufficient energizing voltage. While the push button 14 is depressed, the rectifier 4 is energized with the output voltage of the entire secondary winding 17 which in this case will be the same as the output voltage furnished solely by the portion 18 of this winding in the former operation. The portions 18 and 19 in series, with the portions 13 and 15 of the primary winding 10 energized give a sum total equivalent to the secondary voltage available across portion 18 of the secondary winding when only portion 13 of the primary winding 10 is energized.

The simple selector means comprising two push buttons and utilizing the selective turns ratio of the transformer provides a complete control for bi-directional operation of a D. C. motor receiving uniform operating voltage from rectifiers supplied by the same transformer. The directional rotation may be selected at will and automatically controlled by the potential difference existing between terminals of a secondary winding of the transformer 11.

The single electro-magnetic inter-coupling by means of a transformer permits a reduction in the number of conductors and easy isolation of the two circuits where high voltages must be taken into consideration.

I claim:

1. In an electrical control system for remote actuation of electrical apparatus in two directions of motion, a controlled element, an operating circuit for energizing said element, a control circuit isolated from said operating circuit as to electrical conductivity, a transformer intercoupling said circuits having a divided primary winding connected to said control circuit, and a secondary winding connected to said operating circuit, switching means for energizing one portion of said primary winding thereby selecting a predetermined turns-ratio between said windings for energizing said operating circuit in one direction of movement of said controlled element and switching means for energizing both portions of said divided primary winding and thereby selecting another turns-ratio for reverse operation of said controlled element.

2. In an electrical control system for remote actuation of electrical apparatus in two directions of motion, a controlled element, an operating circuit for energizing said element, a control circuit isolated from said operating circuit as to electrical conductivity, a transformer intercoupling said circuits having a divided primary winding connected to said control circuit, and a secondary winding connected to said operating circuit, switching means for energizing one portion of said primary winding thereby selecting a predetermined turns-ratio between said windings for energizing said operating circuit in one direction of movement of said controlled element and switching means for energizing both portions of said divided primary winding and thereby selecting another turns-ratio for reverse operation of said controlled element, and a selector switch in said operating circuit responsive solely to a potential difference obtained upon selection of one of said turns-ratios, said selector switch controlling the energizing of said controlled element in the direction of movement selected.

3. In an electrical control system for remote actuation of electrical apparatus in two directions of motion, a controlled element, an operating circuit for energizing said element, a control circuit isolated from said operating circuit as to electrical conductivity, a transformer intercoupling said circuits having a divided primary winding connected to said control circuit, and a divided secondary winding connected to said operating circuit, switching means for energizing one portion of said primary winding thereby selecting a predetermined turns-ratio between said windings for energizing said operating circuit in one direction of movement of said controlled element and switching means for energizing both portions of said divided primary winding and thereby selecting another turns-ratio for reverse operation of said controlled element, and an electromagnetic switch in said operating circuit having an actuating winding connected to one portion of said secondary winding, said selector switch determining the direction of movement of said controlled element.

4. In a remote control system, a transformer having a divided primary winding and a divided secondary winding, means for energizing said winding selectively from a source of fixed potential comprising a first switch connecting one portion of said primary winding with said source, a second switch connecting the entire primary winding to said source whereby the effective voltage transfer ratio between said primary and secondary windings is selectable at will, an electromagnetic switch in the secondary circuit having a plurality of contacts, said switch being responsive to a discreet voltage magnitude resulting from energizing one portion of said primary winding of said transformer, a controlled apparatus in said secondary circuit adapted to bi-directional actuation, circuit means for connecting certain of said contacts of said switch for responsive actuation of said apparatus in one direction of movement and other of said contacts for actuation in the opposite direction.

5. In a remote control system, a transformer having a divided primary winding and a divided secondary winding, means for energizing said winding selectively from a source of fixed potential comprising a first switch connecting one portion of said primary winding with said source, a second switch connecting the entire primary winding to said source whereby the effective voltage transfer ratio between said primary and secondary windings is selectable at will, and electro-magnetic switch in the secondary circuit actuated upon energizing one portion of said primary winding, said switch having a plurality of contacts, a controlled apparatus in said secondary circuit operating on direct current adapted to bi-directional actuation, a pair of rectifiers, circuit means for connecting certain of said contacts of said switch for energizing one of said rectifiers from one portion of said secondary winding upon actuation of said switch and for energizing the other of said rectifiers from both portions of said secondary winding upon deenergized condition of said switch whereby said rectifiers are energized substantially at the source voltage irrespective of the energization of said primary windings.

6. In an electrical control system a controlled apparatus having bi-directional operating characteristics, a source of fixed potential for energizing said system, a device for effecting a transfer of operating potentials between said source and said apparatus in variable magnitudes, means for utilizing one of said voltage magnitudes for one direction of operation of said apparatus and another of said voltage magnitudes for the reverse operation thereof, said means including a switching element automatically responsive to a discreet value of potential and means located at a point remote from said apparatus for energizing said device selectively as to voltage transfer thereby effecting desired operation of said apparatus.

HERBERT J. WEBB.

No references cited.